US010877183B2

(12) United States Patent
Ding (10) Patent No.: US 10,877,183 B2
(45) Date of Patent: Dec. 29, 2020

(54) OPTICAL ARTICLE COMPRISING AN ANTIREFLECTIVE COATING WITH A HIGH REFLECTION IN THE NEAR INFRARED REGION (NIR)

(71) Applicant: ESSILOR INTERNATIONAL, Charenton-le-Pont (FR)

(72) Inventor: Xingzhao Ding, Singapore (SG)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 123 days.

(21) Appl. No.: 16/098,778

(22) PCT Filed: May 4, 2017

(86) PCT No.: PCT/EP2017/060652
§ 371 (c)(1),
(2) Date: Nov. 2, 2018

(87) PCT Pub. No.: WO2017/191254
PCT Pub. Date: Nov. 9, 2017

(65) Prior Publication Data
US 2019/0137660 A1    May 9, 2019

(30) Foreign Application Priority Data

May 4, 2016    (EP) .................................... 16305528

(51) Int. Cl.
*G02C 7/10*        (2006.01)
*G02B 1/115*       (2015.01)
*G02B 5/28*        (2006.01)

(52) U.S. Cl.
CPC .............. *G02B 1/115* (2013.01); *G02B 5/282* (2013.01); *G02C 7/107* (2013.01)

(58) Field of Classification Search
None
See application file for complete search history.

(56) References Cited

U.S. PATENT DOCUMENTS 4,211,823 A     7/1980  Suzuki et al.
4,556,599 A  * 12/1985  Sato ...................... G02B 5/282
                                                                359/359

(Continued)

FOREIGN PATENT DOCUMENTS

CN        101866063        10/1920
FR         2702486         9/1994

(Continued)

OTHER PUBLICATIONS

International Search Report and Written Opinion issued in International Patent Application No. PCT/EP2017/060652, dated Aug. 1, 2017.

*Primary Examiner* — Darryl J Collins
(74) *Attorney, Agent, or Firm* — Norton Rose Fulbright US LLP (57) ABSTRACT

This invention relates to an ophthalmic lens comprising an optical article comprising a transparent substrate with a front main face and with a rear main face, at least one of the main faces being coated with an antireflective coating, characterized in that the number of layers of said antireflective coating is higher than or equal to 5, and the antireflective coating comprises: —at least one layer having a low refractive index which is <1.6, defined as "LI layer", —at least one layer having a very high refractive index which is ≥2.2, defined as "VHI layer" and —at least one layer having a high refractive index which is ≥1.6 and <2.2, defined as "HI layer", the HI layer being the layer which is the nearest from said substrate amongst said LI, HI and VHI layers, and such that the mean reflection factor in the near infrared (NIR) region $R_m^{NIR}$ of said antireflective coating is higher than or equal to 40% at an angle of incidence lower than 35°.

19 Claims, 7 Drawing Sheets

(56) References Cited

U.S. PATENT DOCUMENTS

| | | | |
|---|---|---|---|
| 5,015,523 A | 5/1991 | Kawashima et al. | |
| 6,250,758 B1 * | 6/2001 | Yoshihara | B32B 15/08 351/159.63 |
| 2004/0202897 A1 | 10/2004 | Kondo | |
| 2004/0240093 A1 | 12/2004 | Yoshikawa et al. | |
| 2010/0330378 A1 | 12/2010 | Takahashi et al. | |
| 2015/0146161 A1 | 5/2015 | Rigato et al. | |

FOREIGN PATENT DOCUMENTS

| | | |
|---|---|---|
| WO | WO 2011/080472 | 7/2011 |
| WO | WO 2012/076714 | 6/2012 |
| WO | WO 2015/119016 | 8/2015 |

* cited by examiner

Exemple 7

Fig. 4

Exemple 8

Exemple 11

Fig.8

Exemple 12

OPTICAL ARTICLE COMPRISING AN ANTIREFLECTIVE COATING WITH A HIGH REFLECTION IN THE NEAR INFRARED REGION (NIR)

CROSS-REFERENCE TO RELATED APPLICATIONS

This application is a national phase application under 35 U.S.C. § 371 of International Application No. PCT/EP2017/060652 filed 4 May 2017, which claims priority to European Patent Application No. 16305528.8 filed 4 May 2016. The entire contents of each of the above-referenced disclosures is specifically incorporated by reference herein without disclaimer.

FIELD OF THE INVENTION

The present invention relates to an optical article comprising an antireflective coating having high reflection in the near infrared (NIR) region, while also strongly reducing reflection in the visible region. The optical article may especially be an ophthalmic lens, such as a spectacle lens.

DESCRIPTION OF RELATED ART

Throughout life, the eye is exposed to daily fluxes of solar radiation. Solar radiation is filtered by the Earth's atmosphere so that at sea level about 80% of the solar energy is restricted to a narrow spectral band from about 300 nm in the ultraviolet to 1100 nm in the infrared. Longer wavelengths are primarily filtered out by atmospheric water vapor, whereas shorter wavelengths are absorbed by the ozone layer. Furthermore, certain spectral components of solar light incident on the cornea are partially filtered out before reaching the human retina. Both the cornea and the lens absorb part of the infrared radiation—mainly the water bands at 980 nm, 1200 nm, and 1430 nm. The vitreous absorbs light above 1400 nm, up to 10 µm.

Thus, the non-ionizing radiation reaching the retina is the so-called 'visible component' of the electromagnetic spectrum (380-780 nm), and some of the near infrared (780-1400 nm, NIR).

However, visible and infrared light reaching the human retina can induce tissue damage via at least one of three fundamental processes: photomechanical (or photoacoustic), photothermal (photocoagulation) and photochemical, depending on its fluence rate, total dose and spectral characteristics.

Especially, intensive NIR would be harmful to retina. It has been also reported that NIR could be one of the potential causes for dry eyes and cataracts.

Currently, for ophthalmic lenses, such as transparent spectacle lenses, the essential requirement is only the high transmittance in visible region by using an antireflection coating.

Indeed, traditional antireflective coatings are only designed and optimized to reduce reflection on the lens surface in the visible region, typically within the spectrum range of from 380 to 780 nm, but not in the near infrared (NIR) region. In general, the mean light reflection factor in the visible region $R_v$ on the front and/or rear faces of an ophtalmic lens is between 1.5 to 2.5%. Some of these antireflective coatings may also be designed and optimized to reduce reflection on the lens surface within the UVA band of from 315 to 400 nm and/or the UVB band of from 280 to 315 nm.

An antireflection coating usually consists of a multilayer comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

Accordingly, it is nowadays well known how to achieve an efficient coating with very low reflection in visible region; however it is difficult to achieve an efficient coating having both a very low reflection in visible region and an high reflection in the NIR region, especially in the ophtalmic field requiring very thin antireflective film.

It is known in the art to provide interferential multilayer IR filters for digital imaging devices (US 2004/0202897) or for ophtalmic lense (such as CN 101866063) which have in general more than 40 layers. These kinds of stacks are thick and have many layers, which is not acceptable practically for ophthalmic lens applications.

In addition, optimizing the reflection performances over the NIR region reveals generally detrimental to the antireflective performances in the visible region. Conversely, optimizing only the antireflective performances in the visible region does not make sure that satisfactory reflection properties can be obtained in the NIR region.

However recently, the document US2015/0146161 assigned to Indo Optical describes a multiple layer that reflects a significant percentage of infra-red radiation while it maintains the anti-reflective properties in the visible, with a limited angular dispersion in the residual reflection, by adapting standard anti-reflective filter technology. Most of the exemplified stacks presented in this document have 4 layers: $TiO_2/SiO_2/TiO_2/SiO_2$ or 5 layers: $SiO_2/TiO_2/SiO_2/TiO_2/SiO_2$ or 6 layers: $TiO_2/SiO_2/TiO_2/SiO_2/TiO_2/SiO_2$. The most preferred example is: $SiO_2$ (15 nm)/$TiO_2$ (127 nm)/$SiO_2$ (176 nm)/$TiO_2$ (59 nm)/$ZrO_2$ (50 nm)/$SiO_2$ (62 nm), named hereafter "Indo lens".

The antireflective coatings described in this application, especially the most preferred example, are quite efficient in the NIR region (T IR-A=72.0%, so the $R_m^{NIR}$<30%), while being at the same time capable of relatively reducing the reflection in the visible region ($R_v$ 15°=0.9% and $R_v$ 60°=4.7%).

However, it would be advisable to improve the multiple layer coating described in this document.

Therefore, there is still a need to provide novel antireflective coatings having very good antireflective properties at least in the visible region and possibly in the UVA and UVB bands, while having at the same time high reflection in the NIR region versus the antireflective coatings of the prior art.

SUMMARY OF THE INVENTION

An object of the invention is therefore to remedy the above drawbacks, by seeking to develop a transparent optical article, especially an ophthalmic lens, comprising a substrate in mineral or organic glass comprising at least an antireflective coating, said antireflective coating possessing very good antireflective performances in the visible region, while having high reflection in the NIR region and to do so without compromising the economic and/or industrial feasibility of its manufacture.

The invention therefore relates to an optical article, preferably an ophthalmic lens, comprising a transparent substrate with a front main face and with a rear main face, at least one of the main faces being coated with an antireflective coating, characterized in that the number of layers of said antireflective coating is higher than or equal to 5, and the antireflective coating comprises:

at least one layer having a low refractive index which is <1.6, defined as "LI layer", at least one layer having a very high refractive index which is ≥2.2, defined as "VHI layer" and at least one layer having a high refractive index which is ≥1.6 and <2.2, defined as "HI layer", the HI layer being the layer which is the nearest from said substrate amongst said LI, HI and VHI, and such that the mean reflection factor in the near infrared (NIR) region $R_m^{NIR}$ of said antireflective coating is higher than or equal to 40% at an angle of incidence lower than 35°.

Therefore, the optical article according to the invention comprises an high efficient anti-reflective (AR) coatings with high reflection in the NIR region.

BRIEF DESCRIPTION OF THE DRAWINGS

The present invention will be described in more detail by referring to the appended drawings, wherein.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

In addition, according to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* are calculated between 380 and 780 nm, taking the standard illuminant D 65 and the observer into account (angle of 10°). The observer is a "standard observer" as defined in the international colorimetric system CIE L*a*b*. It is possible to prepare antireflective coatings, without limitation as regards their hue angle ("h").

The optical article prepared according to the present invention is a transparent optical article, preferably a lens or lens blank, and more preferably an ophthalmic lens or lens blank. The optical article may be coated on its convex main side (front side), concave main side (back side), or both sides using the process of the invention.

Generally speaking, the antireflective coating of the optical article according to the invention, which will be called "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephtalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

As previously mentioned, the optical article according to the present invention comprises a transparent substrate with a front main face and with a rear main face, at least one of the main faces being coated with an antireflective coating, especially a multilayered antireflective coating.

Said multilayered antireflective coating is characterized in that the number of layers of said antireflective coating is higher than or equal to 5, and comprises:
- at least one layer having a low refractive index which is <1.6, defined as "LI layer",
- at least one layer having a very high refractive index which is ≥2.2, defined as "VHI layer" and
- at least one layer having a high refractive index which is ≥1.6 and <2.2, defined as "HI layer", the HI layer being the layer which is the nearest from said substrate amongst said LI, HI and VHI, and such that the mean reflection factor in the near infrared (NIR) region $R_m^{NIR}$ of said antireflective coating is higher than or equal to 40% at an angle of incidence lower than 35°.

Herein, the characteristic mean reflection factor in the near infrared (NIR) region $R_m^{NIR}$ (780-1400 nm) is defined by the formula:

$$R_m^{NIR} = \frac{\int_{780}^{1400} R(\lambda) d\lambda}{1400 - 780}$$

wherein $R(\lambda)$ represents the reflection factor at a given wavelength.

The Applicant has surprisingly discovered that the multilayered antireflective coating according to the invention shows good compromise between low $R_v$ and high mean reflection factor in the NIR region, while having a relatively thin physical thickness (in general between 450-550 nm).

Indeed, as it will be shown in the examples below, the multilayered antireflective coating according to the invention enables to obtain a minimum achievable $R_v \leq 0.1\%$ and a high mean reflection factor in NIR region (780-1400 nm) (≥45%). These good results are not achievable with conventional designs based for instance on the followings structures comprising four alternating layers made of high and low refractive index material: $ZrO_2/SiO_2/ZrO_2/SiO_2$; $Ta_2O_5/SiO_2/Ta_2O_5/SiO_2$; $TiO_2/SiO_2/TiO_2/SiO_2$ and/or $Nb_2O_5/SiO_2/Nb_2O_5/SiO_2$.

In addition, the multilayered antireflective coating according to the invention presents the advantage of having a good robustness and aesthetic appearance. Herein, the term "robustness" of a lens is defined as the ability of this lens to resist change despite the variations induced by its manufacture process. These variations depend, for instance, on the type of substrate which is used, the setting of the manufacturing machine (temperature schedule, appropriate time, setting of the electron gun . . . ) and/or its usage mode, the replacement of said manufacturing machine by another one.

Preferably, the mean reflection factor in the near infrared (NIR) region $R_m^{NIR}$ of the antireflective coating is higher than or equal to 42%, in particular higher than or equal to 45%, at an angle of incidence lower than 35°.

The multilayered antireflective coatings described in this application are very efficient in the visible region. Especially, the mean light reflection factor in the visible region $R_v$ of the antireflective coating is lower than or equal to 2.5%, preferably lower than or equal to 2.0%, more preferably lower than or equal to 1.5%, and is in general lower than or equal to 1.0%, such as lower than or equal to 0.5%, for at least an angle of incidence lower than 35°.

The "mean light reflection factor," noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

The multilayered antireflective coating of the invention comprises a stack of at least five layers made of dielectric materials having a very high refractive index (VHI), an high refractive index (HI) and a low refractive index (LI). It is here a simple stack, since the layer total number in the antireflective coating is higher than or equal to 5, preferably higher than or equal to 6, and lower than or equal to 10, more preferably lower than or equal to 9, even more preferably lower than or equal to 8, such as lower than or equal to 7 and most preferably equal to 5 or 6 layers.

More preferably, the antireflective coating comprises at least two layers with a low refractive index (LI), at least two layers with a very high refractive index layer (VHI) and at least one layer with an high refractive index layer (HI), such as at least two layers with an high refractive index layer (HI).

As used herein, a layer of the antireflective coating is defined as having a thickness higher than or equal to 1 nm. Thus, any layer having a thickness lower than 1 nm will not be considered when counting the number of layers in the antireflective coating. A sub-layer (such as described below) either is not considered when counting the number of layers of the antireflective coating.

Unless stated otherwise, all thicknesses disclosed in the present application relate to physical thicknesses.

HI layers, VHI layers and LI layers don't need to alternate with each other in the stack, although they also may, according to one embodiment of the invention. Thus, two VHI layers (or more) may be deposited onto each other, as well as two LI layers (or more) or two HI layers (or more) may be deposited onto each other.

As previously mentioned, the HI layer of the multilayered antireflective coating is the layer which is the nearest from the substrate amongst said LI, HI and VHI layers. According to an embodiment of the invention, said HI layer is in direct contact with the substrate, and according to another embodiment, said HI layer is not in direct contact with the substrate since this one may be coated with one or more functional coatings, such as described below.

Especially, a VHI layer is directly disposed onto said HI layer which is the nearest from the substrate, so as to form a bilayer HI/VHI.

According to a characteristic of the invention, the layer that is directly deposited onto said bilayer HI/VHI is a LI layer.

Preferably, the antireflective coating comprises at least two VHI layers, each one being interleaved and in direct contact with a LI layer or with an LI layer and an HI layer.

In general, the outer layer of said antireflective coating which is the furthest from the substrate is an LI layer.

According to one embodiment of the invention, the antireflective coating may comprise in the direction moving away from the substrate, the following layers which are in direct contact with each other: an HI layer/a VHI layer/a LI layer/a VHI layer/an optional HI layer/and a LI layer.

According to this embodiment, the antireflective coating generally comprises in the direction moving away from the substrate:

an HI layer having a physical thickness ranging from 22 to 79 nm;

a VHI layer having a physical thickness ranging from 53 to 117 nm;

a LI layer having a physical thickness ranging from 160 to 192 nm;

a VHI layer having a physical thickness ranging from 81 to 98 nm;

an optional HI layer having a physical thickness ranging from 0 to 26 nm, and a LI layer having a physical thickness ranging from 53 to 81 nm.

According to another embodiment, the antireflective coating may comprise in the direction moving away from the substrate, the following layers which are in direct contact with each other: an HI layer/a VHI layer/a LI layer/an optional HI layer comprising preferably $ZrO_2$/a VHI layer and a LI layer.

Especially, according to this embodiment, the antireflective coating may comprise in the direction moving away from the substrate:

an HI layer having a physical thickness ranging from 31 to 54 nm;

a VHI layer having a physical thickness ranging from 74 to 98 nm;

a LI layer having a physical thickness ranging from 165 to 190 nm;

an optional HI layer having a physical thickness ranging from 0 to 5 nm, preferably from 0 to 2 nm;

a VHI layer having a physical thickness ranging from 87 to 98 nm, and a LI layer having a physical thickness ranging from 64 to 85 nm.

In the present application, a layer of the antireflective coating is said to be a layer with an very high refractive index (VHI) when its refractive index is higher than or equal to 2.2, preferably higher than or equal to 2.3, even more preferably higher than or equal to 2.35, even more preferably higher than or equal to 2.37. Said VHI layer preferably has a refractive index lower than 3. A layer of the antireflective coating is said to be a low refractive index layer (LI) when its refractive index is lower than 1.60, preferably lower than or equal to 1.50, more preferably lower than or equal to 1.48. Said LI layer preferably has a refractive index higher than 1.1. Moreover, a layer of the antireflective coating is said to be a high refractive index (HI) when its refractive index is ranging from 1.6 (lower limit included) to 2.2 (upper limit not included).

Unless otherwise specified, the refractive indexes referred to in the present application are expressed at 25° C. at a wavelength of 550 nm.

The HI layer is a traditional high refractive index layer that is well known in the art. It generally comprises one or more metal oxides such as, without limitation, zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), yttrium oxide ($Y_2O_3$) and mixtures thereof. The preferred materials include zirconia ($ZrO_2$), tantalum pentoxide ($Ta_2O_5$). Optionally, the HI layers may further contain silica or other materials with a low refractive index, provided they have a refractive index higher than or equal to 1.6 as indicated hereabove.

The LI layer is also well known and may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$). Optionally, the LI layers may further contain materials with a high refractive index or very high refractive index, provided the refractive index of the resulting layer is lower than to 1.6.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

The VHI layer according to the invention may comprise, without limitation, one or more metal oxides selected from: niobium oxide ($Nb_2O_5$), titanium dioxide ($TiO_2$) or mixture thereof. Optionally, the VHI layers may further contain materials with a low refractive index or an high refractive index provided they have a refractive index higher than or equal to 2.2 as indicated hereabove.

Generally, the VHI layers have a physical thickness ranging from 70 to 150 nm, preferably from 75 to 120 nm and typically from 75 to 115 nm. In particular, the HI layers may have a physical thickness ranging from 4 to 90 nm, preferably ranging from 25 to 85 nm and typically from 30 and 80. In addition, the LI layers may have a physical thickness ranging from 40 to 200 nm, preferably from 50 to 190 nm, such as from 55 to 182 nm. In general, the outer LI layer has a thickness which is ranging from 50 to 90 nm, preferably from 55 to 82 nm.

Generally, the antireflective coating total thickness is lower than 1 micrometer, preferably lower than or equal to 800 nm, more preferably lower than or equal to 700 nm and even more preferably lower than or equal to 600 nm. The antireflective coating total thickness is generally higher than 100 nm, preferably higher than 200 nm, more preferably higher than or equal to 300 nm and even more preferably higher than or equal to 400 nm. Typically, the physical thickness of said antireflective coating is ranging from 450 to 500 nm.

The present invention provides hence an antireflective coating with an improved conception, comprising a relatively thin stack made of layers, the thicknesses and materials of which have been selected so as to obtain satisfactory antireflective performances both in the visible region and the NIR region, while having robustness properties.

In one embodiment of the present invention, the antireflective coating may be deposited onto a sub-layer. It should be noted that such antireflective coating sub-layer does not belong to the antireflective coating.

As used herein, an antireflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying substrate (which is generally the anti-abrasion and anti-scratch coating or the bare substrate.

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined hereabove, preferably consists in a silica layer doped with alumina.

In a particular embodiment, the sub-layer consists in a $SiO_2$ layer.

A sub-layer of the monolayer type will be preferably used. However, the sub-layer may be laminated (multilayered), especially when the sub-layer and the underlying substrate have a substantially different refractive index. This applies especially when the underlying substrate, has a high refractive index, i.e. a refractive index higher than or equal to 1.55, preferably higher than or equal to 1.57.

In this case, the sub-layer may comprise, in addition to a 90-300 nm-thick layer, called the main layer, preferably at most three additional layers, more preferably at most two additional layers, interleaved between the optionally coated substrate and such 90-300 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 25 nm-thick $SiO_2$ layer, a 10 nm-thick $ZrO_2$ or $Ta_2O_5$ layer and thereafter the sub-layer main layer.

In general, the antireflective coating is not deposited onto a sub-layer such as described above.

The optical article of the invention may be made antistatic, that is to say not to retain and/or develop a substantial static charge, by incorporating at least one electrically conductive layer into the stack present on the surface of the article.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the anti-reflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminium-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner, because of its low thickness, to obtain antireflective properties and represents a layer with a high refractive index in the antireflective coating. This is the case for those layers made from an electrically conductive and highly transparent material such as ITO layers.

The antireflective coating does not comprise any layer with a thickness higher than or equal to 20 nm, preferably higher than 15 nm, based on indium oxide. When a plurality of indium oxide-based layers are present in the antireflective coating, their total thickness is preferably lower than 20 nm, more preferably lower than 15 nm. As used herein, an indium oxide-based layer is intended to mean a layer comprising at least 50% by weight of indium oxide relative to the layer total weight.

According to a preferred embodiment, the antireflective coating does not comprise any layer with a thickness higher than or equal to 20 nm, preferably higher than 15 nm, comprising indium oxide, tin oxide or zinc oxide. When a plurality of layers comprising indium oxide, tin oxide or zinc oxide are present in the antireflective coating, their total thickness is preferably lower than 20 nm, more preferably lower than 15 nm.

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

Generally, the optical article is an ophthalmic lens, especially a spectacle lens.

The antireflective coatings of the front face and of the rear face may be the same or different.

In an embodiment of the invention, the front face and the rear face of the optical article of the invention are coated with the antireflective coating described above. In another embodiment, the rear face of the optical article of the invention is coated with a conventional antireflective coating having a mean reflection factor in UV range (as defined in WO2012076714) $R_{uv} \leq 10\%$, preferably $R_{uv} \leq 5\%$, different from the one provided on its front face which is according to the invention.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 µm, preferably from 3 to 5 µm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 µm, preferably of from 0.5 to 1.5 µm.

The optical article according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an optical article according to the invention comprises a substrate that is successively coated on its rear face with an impact-resistant primer layer, an anti-abrasion and scratch-resistant layer, an anti-UV, antireflective coating, and with a hydrophobic and/or oleophobic coating, or with a hydrophilic coating which provides antifog properties, or an antifog precursor coating. The optical article according to the invention is preferably an ophthalmic lens for spectacles (spectacle lens), or a blank for ophthalmic lenses. The lens may be a polarized lens, a photochromic lens or a solar lens, which may be tinted or not, be corrective, or not.

The front face of the substrate of the optical article may be successively coated with an impact-resistant primer layer, an abrasion-resistant layer and/or a scratch-resistant layer, an antireflective coating according to the invention, and with a hydrophobic and/or oleophobic coating.

In one embodiment, the optical article according to the invention does not absorb in the visible or not much, which means, in the context of the present application, that its transmission factor in the visible range $\tau_v$, also called relative transmission factor in the visible range, is higher than 90%, more preferably higher than 95%, even more preferably higher than 96% and most preferably higher than 97%.

The factor $\tau_v$ should be understood as defined by the international normalized definition (ISO 13666:1998 Standard) and is measured in accordance with the ISO 8980-3 Standard. It is defined in the wavelength range of from 380 to 780 nm.

Preferably, the multilayered antireflective coating has a hue (h) from 275° to 350°, preferably from 280° to 325°, more preferably from 300° to 320° according to the international colorimetric CIE L*a*b* for an angle of incidence θ of less than or equal to 35°, preferably lower than or equal 30, in particular lower than or equal 25° and typically lower than or equal 20°.

Hence, the antireflective coating of the present invention shows a constant perceived residual color variation according to the angle of incidence θ. Indeed, the inventors observed that the ophthalmic lenses according to the invention have a great colorimetric reliability, i.e. the hue ange h and the chroma C* were particularly stable over time and iterations (σh*≤9.8 and σC*≤9).

The following examples illustrate the present invention in a more detailed, but non-limiting manner.

EXAMPLES

1. General Procedures

The optical articles used in the examples comprise an ORMA® lens substrate from ESSILOR, having a 65 mm diameter, a refractive index of 1.50, and a power of −2.00 diopters and a center thickness of 1.2 mm, coated on its front and rear faces with the anti-abrasion and scratch-resistant coating (HC 1.5) disclosed in Example 3 of the patent EP 0 614 957 (refractive index equal to 1.47 and thickness of 3.5 μm), based on a hydrolyzate composed of GLYMO and DMDES, of colloidal silica and aluminium acetylacetonate, and thereafter with an antireflective coating according to the present invention on front face.

Said anti-abrasion and scratch-resistant coating was obtained by depositing and hardening a composition comprising by weight, 224 parts of GLYMO, 80.5 parts of HCl 0.1 N, 120 parts of DMDES, 718 parts of 30% by weight colloidal silica in methanol, 15 parts of aluminium acetylacetonate and 44 parts of ethylcellosolve. The composition also contained 0.1% of surfactant FLUORAD™ FC-430® manufactured by 3M, by weight relative to the composition total weight.

The layers of the antireflective coating were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, coated on its rear face with the anti-abrasion and scratch-resistant coating, into a vacuum deposition chamber, a step of pumping until a high-vacuum is obtained, a step of activating the surface of the substrate by means of an argon ion beam (anode current: 1 A, anode voltage: 100 V, neutralization current: 130 mA), turning the ion irradiation off, forming the sub-layer on the anti-abrasion and scratch-resistant coating, then subsequently the various layers of the antireflective coating by successive evaporations and at last a ventilation step.

3. Results

The structural characteristics and the optical performances of the ophthalmic lenses obtained in the Examples 1 to 14 are detailed hereunder. The reflection graphs between 280 and 780 nm of some articles prepared are illustrated on FIGS. 1-10, with various angles of incidence.

The optical values are those of the front face. Factors $R_m^{NIR}$, $R_v$, chroma (C*) and hue (h) of reflected light are provided for an angle of incidence of 15°, a standard illuminant D65 and a standard observer (angle 10°).

| Example 1 | |
|---|---|
| Substrate + HC 1.5 | |
| ZrO$_2$ | 47.92 nm |
| TiO$_2$ | 82.83 nm |
| SiO$_2$ | 171.21 nm |
| TiO$_2$ | 89.27 nm |
| ZrO$_2$ | 6.73 nm |
| SiO$_2$ | 74.43 nm |
| Air | |
| R$_v$ (15°) | 0.2% |
| R$_m^{NIR}$ (15°) | 45.1% |
| h* | 304 |
| σh* | 9.8 |
| C* | 29 |
| σC* | 8.7 |

Example 2

Substrate + HC 1.5

| Layer | Thickness |
|---|---|
| $ZrO_2$ | 32.29 nm |
| $TiO_2$ | 100.66 nm |
| $SiO_2$ | 187.42 nm |
| $TiO_2$ | 81.27 nm |
| $ZrO_2$ | 25.57 nm |
| $SiO_2$ | 53.85 nm |
| Air | |

| | |
|---|---|
| $R_v (15°)$ | 1.5% |
| $R_m^{NIR} (15°)$ | 46.9% |
| h* | 320 |
| σh* | 5.1 |
| C* | 50 |
| σC* | 9.0 |

Example 3

Substrate + HC 1.5

| Layer | Thickness |
|---|---|
| $ZrO_2$ | 49.21 nm |
| $Nb_2O_5$ | 80.91 nm |
| $SiO_2$ | 170.65 nm |
| $Nb_2O_5$ | 80.91 nm |
| $ZrO_2$ | 4.07 nm |
| $SiO_2$ | 76.76 nm |
| Air | |

| | |
|---|---|
| $R_v (15°)$ | 0.15% |
| $R_m^{NIR} (15°)$ | 46.3% |
| h* | 304 |
| σh* | 7.8 |
| C* | 32 |
| σC* | 8.6 |

Example 4

Substrate + HC 1.5

| Layer | Thickness |
|---|---|
| $ZrO_2$ | 31.60 nm |
| $Nb_2O_5$ | 101.2 nm |
| $SiO_2$ | 188.40 nm |
| $Nb_2O_5$ | 81.82 nm |
| $ZrO_2$ | 23.92 nm |
| $SiO_2$ | 55.20 nm |
| Air | |

| | |
|---|---|
| $R_v (15°)$ | 1.5% |
| $R_m^{NIR} (15°)$ | 48.3% |
| h* | 321 |
| σh* | 4.9 |
| C* | 50 |
| σC* | 8.5 |

Example 5

Substrate + HC 1.5

| Layer | Thickness |
|---|---|
| $ZrO_2$ | 42.53 nm |
| $TiO_2$ | 96.83 nm |
| $SiO_2$ | 192.07 nm |
| $TiO_2$ | 77.03 nm |
| $ZrO_2$ | 31.44 nm |
| $SiO_2$ | 57.38 nm |
| Air | |

| | |
|---|---|
| $R_v (15°)$ | 0.8% |
| $R_m^{NIR} (15°)$ | 45.1% |
| h* | 315 |
| σh* | 1.9 |
| C* | 76 |
| σC* | 6.8 |

Example 6

Substrate + HC 1.5

| Layer | Thickness |
|---|---|
| $ZrO_2$ | 42.22 nm |
| $Nb_2O_5$ | 97.31 nm |
| $SiO_2$ | 193.21 nm |
| $Nb_2O_5$ | 77.40 nm |
| $ZrO_2$ | 31.406 nm |
| $SiO_2$ | 57.39 nm |
| Air | |

| | |
|---|---|
| $R_v (15°)$ | 0.8% |
| $R_m^{NIR} (15°)$ | 46.4% |
| h* | 315 |
| σh* | 2.0 |
| C* | 76 |
| σC* | 6.7 |

Example 7

Substrate + HC 1.5

| Layer | Thickness |
|---|---|
| $ZrO_2$ | 53.12 nm |
| $TiO_2$ | 78.84 nm |
| $SiO_2$ | 174.55 nm |
| $Nb_2O_5$ | 86.83 nm |
| $ZrO_2$ | 9.32 nm |
| $SiO_2$ | 75.61 nm |
| Air | |

| | |
|---|---|
| $R_v (15°)$ | 0.15% |
| $R_m^{NIR} (15°)$ | 45.3% |
| h* | 309 |
| σh* | 4.5 |
| C* | 50 |
| σC* | 8.7 |

Example 8

Substrate + HC 1.5

| Layer | Thickness |
|---|---|
| $ZrO_2$ | 52.75 nm |
| $Nb_2O_5$ | 79.87 nm |
| $SiO_2$ | 175.06 nm |
| $TiO_2$ | 85.24 nm |
| $ZrO_2$ | 11.60 nm |
| $SiO_2$ | 74.44 nm |
| Air | |

| | |
|---|---|
| $R_v (15°)$ | 0.2% |
| $R_m^{NIR} (15°)$ | 45.3% |
| h* | 309 |
| σh* | 4.4 |
| C* | 50 |
| σC* | 8.8 |

Example 9

Substrate + HC 1.5

| Layer | Thickness |
|---|---|
| $Ta_2O_5$ | 47.14 nm |
| $TiO_2$ | 79.65 nm |
| $SiO_2$ | 181.15 nm |
| $TiO_2$ | 85.34 nm |
| $Ta_2O_5$ | 13.58 nm |
| $SiO_2$ | 69.73 nm |
| Air | |

| | |
|---|---|
| $R_v (15°)$ | 0.8% |
| $R_m^{NIR} (15°)$ | 46.0% |
| h* | 316 |
| σh* | 4.9 |
| C* | 50 |
| σC* | 8.3 |

| Example 10 | |
|---|---|
| Substrate + HC 1.5 | |
| $Ta_2O_5$ | 45.55 nm |
| $Nb_2O_5$ | 81.08 nm |
| $SiO_2$ | 180.20 nm |
| $Nb_2O_5$ | 89.77 nm |
| $Ta_2O_5$ | 7.07 nm |
| $SiO_2$ | 71.78 nm |
| Air | |
| $R_v$ (15°) | 0.8% |
| $R_m^{NIR}$ (15°) | 47.6% |
| h* | 316 |
| σh* | 6.2 |
| C* | 45 |
| σC* | 8.4 |

| Example 11 | |
|---|---|
| Substrate + HC 1.5 | |
| $ZrO_2$ | 40.35 nm |
| $TiO_2$ | 95.56 nm |
| $SiO_2$ | 184.86 nm |
| $TiO_2$ | 95.56 nm |
| $SiO_2$ | 73.66 nm |
| — | — |
| Air | |
| $R_v$ (15°) | 0.8% |
| $R_m^{NIR}$ (15°) | 46.0% |
| h* | 318 |
| σh* | 4.1 |
| C* | 50 |
| σC* | 7.8 |

| Example 12 | |
|---|---|
| Substrate + HC 1.5 | |
| $ZrO_2$ | 52.26 nm |
| $TiO_2$ | 76.30 nm |
| $SiO_2$ | 169.98 nm |
| $TiO_2$ | 90.61 nm |
| $SiO_2$ | 80.31 nm |
| — | — |
| Air | |
| $R_v$ (15°) | 0.1% |
| $R_m^{NIR}$ (15°) | 44.0% |
| h* | 305 |
| σh* | 4.3 |
| C* | 36 |
| σC* | 8.2 |

| Example 13 | |
|---|---|
| Substrate + HC 1.5 | |
| $HfO_2$ | 51.27 nm |
| $TiO_2$ | 89.47 nm |
| $SiO_2$ | 177.56 nm |
| $TiO_2$ | 86.55 nm |
| $HfO_2$ | 13.07 nm |
| $SiO_2$ | 71.85 nm |
| Air | |
| $R_v$ (15°) | 0.2% |
| $R_m^{NIR}$ (15°) | 44.7% |
| h* | 310 |
| σh* | 4.4 |
| C* | 50 |
| σC* | 8.3 |

| Example 14 | |
|---|---|
| Substrate + HC 1.5 | |
| $Al_2O_3$ | 78.57 nm |
| $TiO_2$ | 114.66 nm |
| $SiO_2$ | 180.89 nm |
| $TiO_2$ | 92.26 nm |
| $Al_2O_3$ | 11.83 nm |
| $SiO_2$ | 69.35 nm |
| Air | |
| $R_v$ (15°) | 0.2% |
| $R_m^{NIR}$ (15°) | 44.1% |
| h* | 312 |
| σh* | 4.7 |
| C* | 50 |
| σC* | 9.8 |

It could be observed that the optical articles of the invention possess both very good antireflective properties in the visible region (Rv<1.50%) and high reflection in the NIR region (≥44.0%), with no detrimental influence on the aesthetic performance and robustness properties (σh*≤9.8 and σC*≤9).

Moreover, the lenses obtained in Examples 1 to 14 have outstanding transparency properties, a good resistance to abrasion and to scratches, and a good resistance to a hot water dip-treatment, followed with a mechanical stress on the surface. The adhesion of the coatings to the substrate was also very satisfactory.

4. Comparative Examples (FIGS. 11 to 13)

Figure 1:
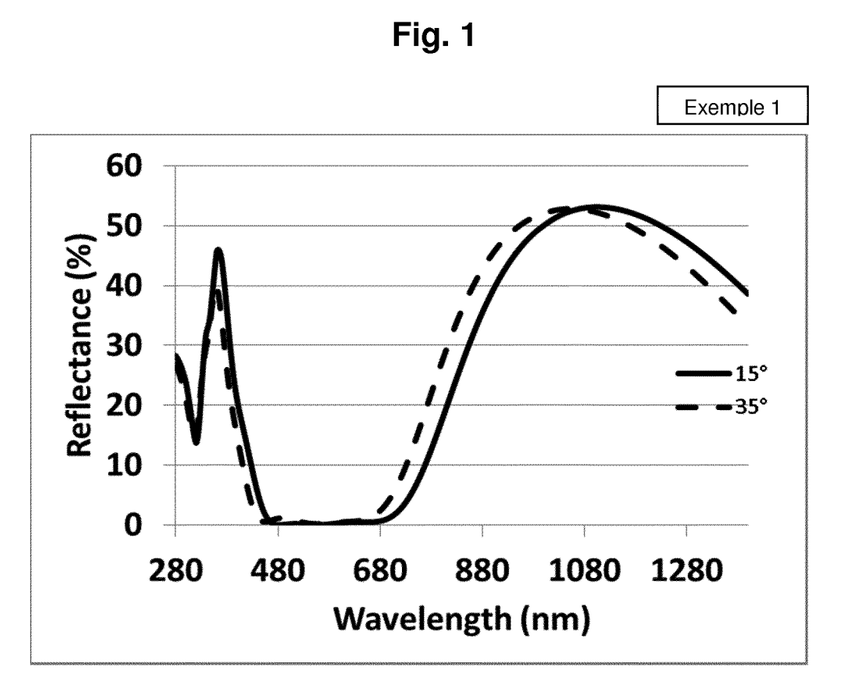
FIGS. 1 to 10 show the variation of the reflection (R) on the front face surface of some lenses prepared in the examples of the present application (respectively according to the examples 1, 3, 7-14) at an angle of incidence θ of 15° and 35° as a function of the wavelength in the UVB (280 to 315 nm), UVA (315 to 400 nm) bands, in the visible region (380 to 780 nm) and in the NIR region (780-1400 nm)
Figure 2:
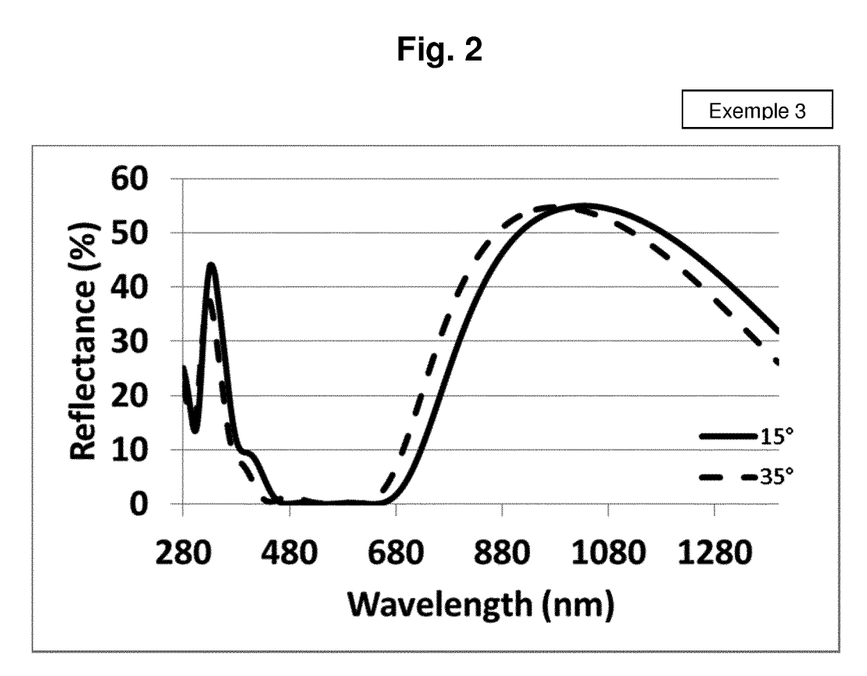
Figure 3:
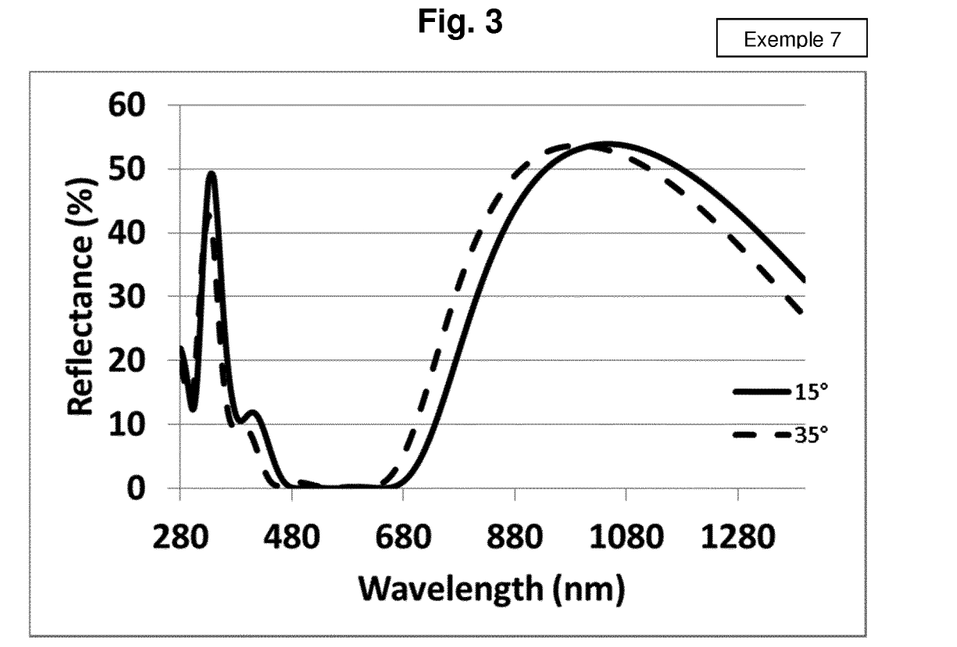
Figure 4:
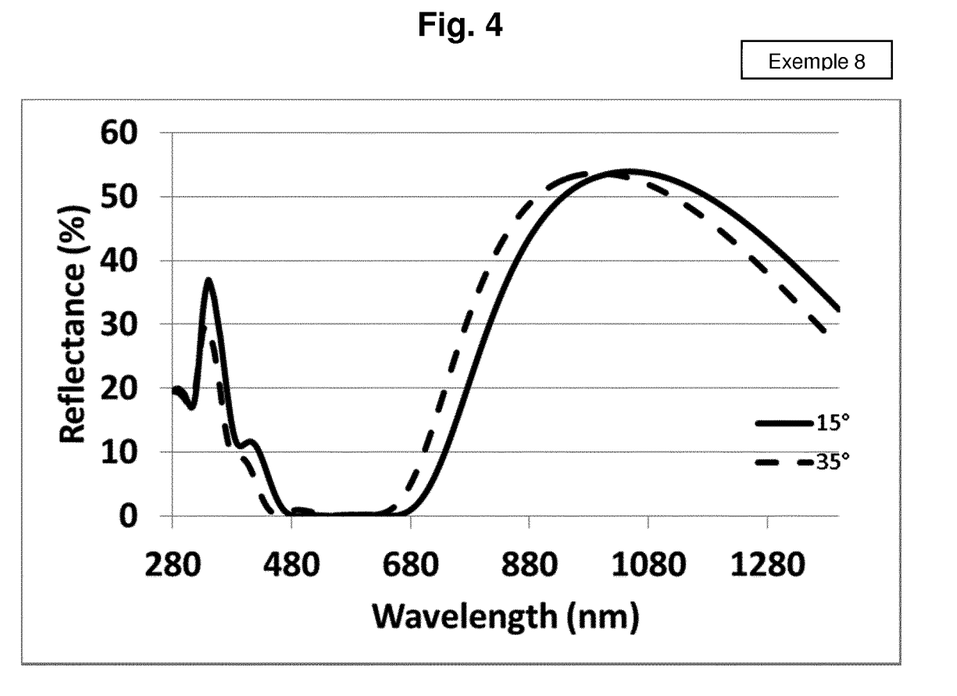
Figure 5:
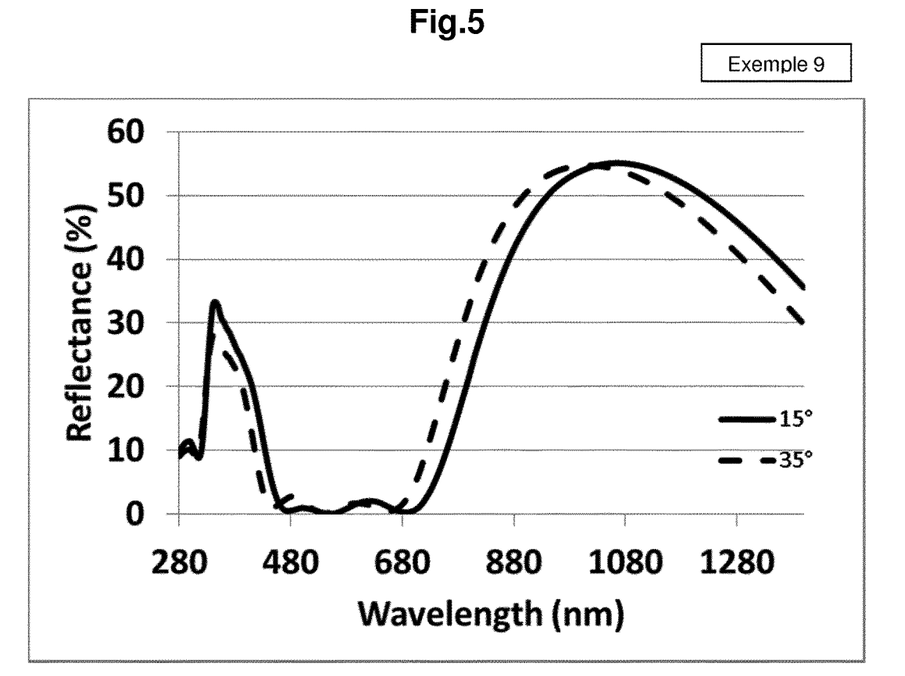
Figure 6:
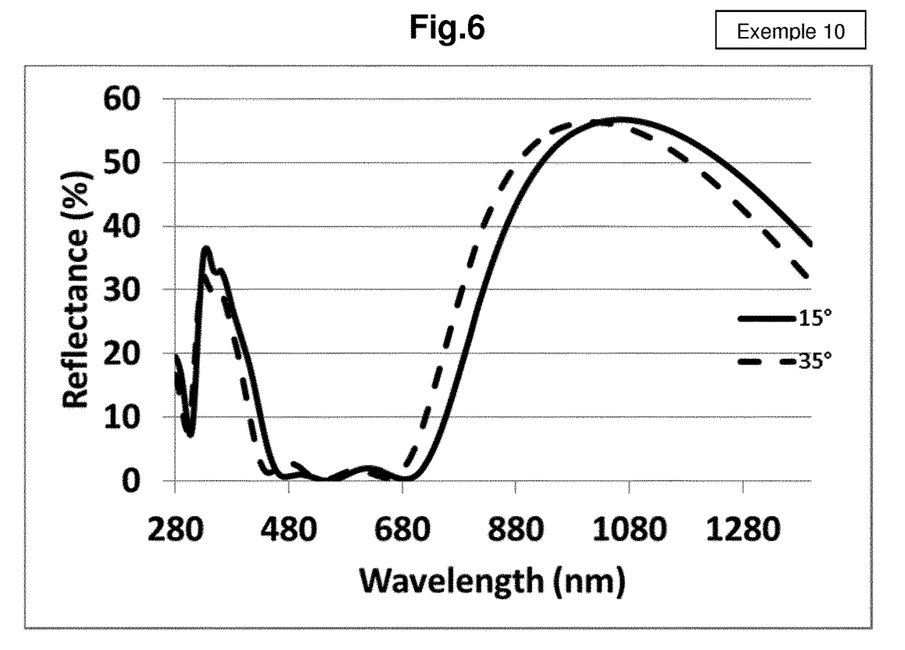
Figure 7:
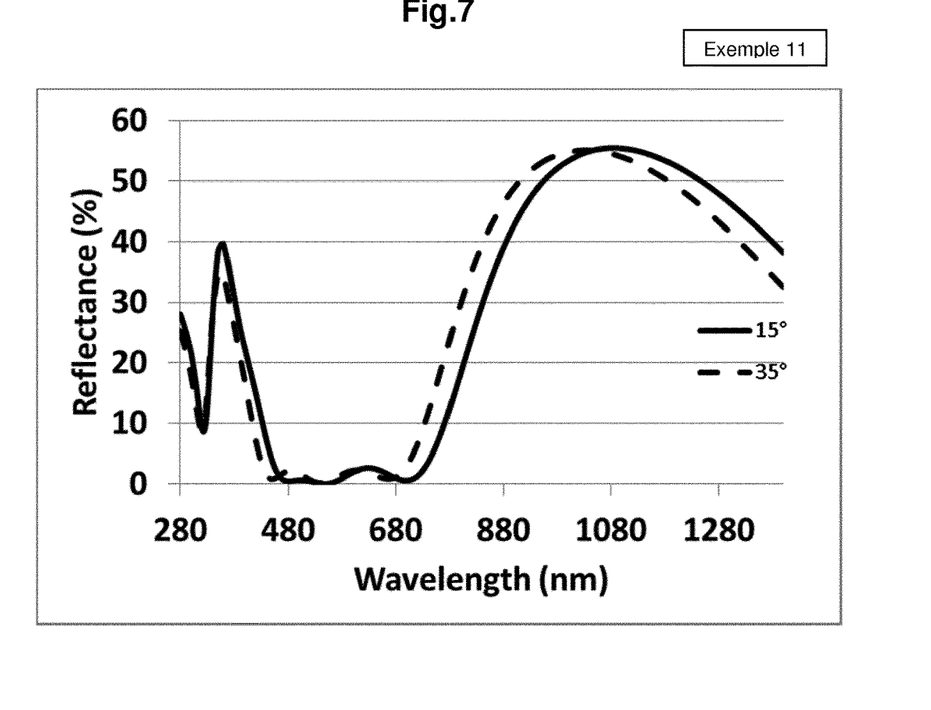
Figure 8:
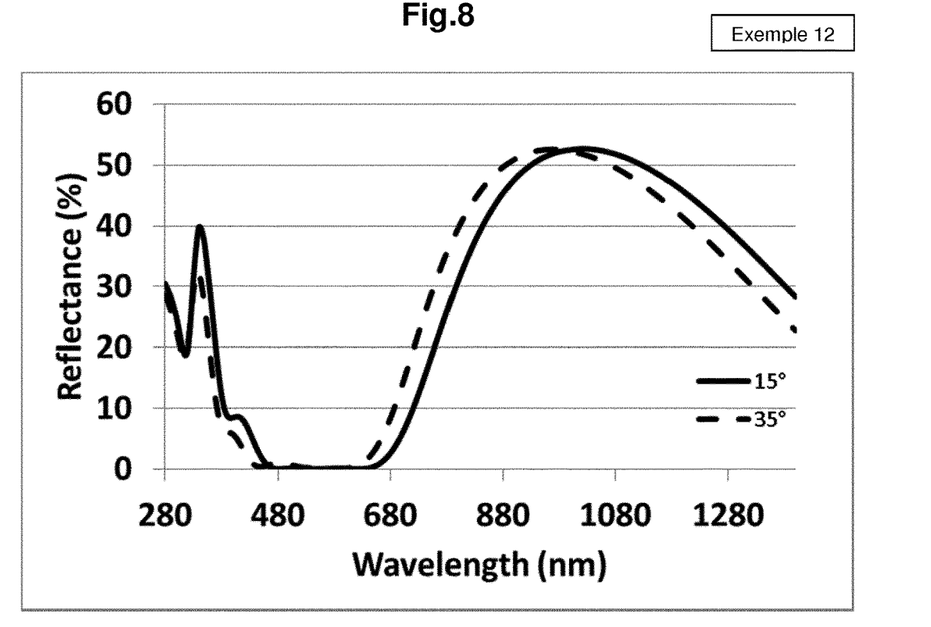
Figure 9:
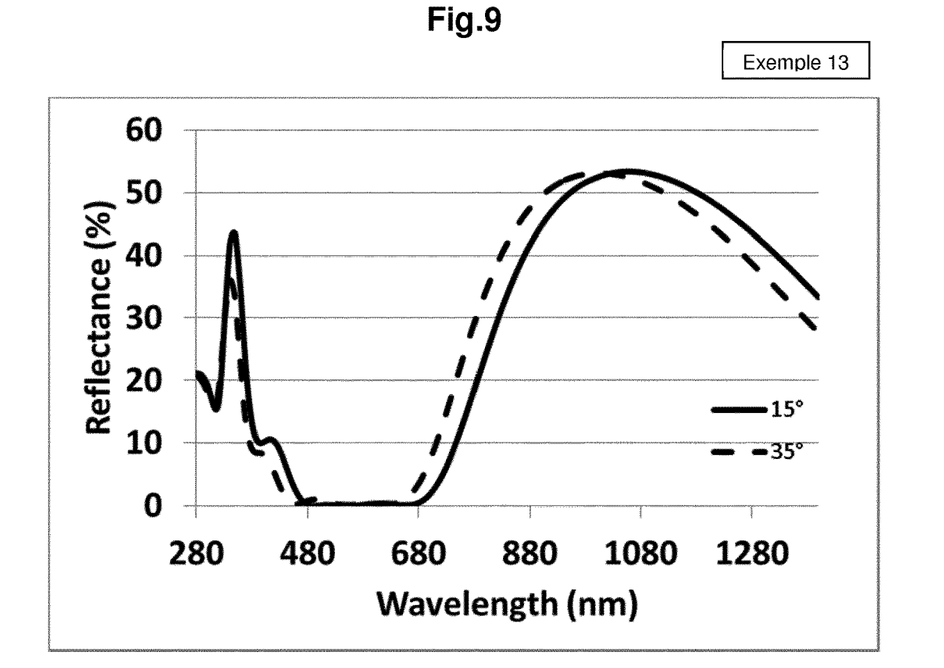
Figure 10:
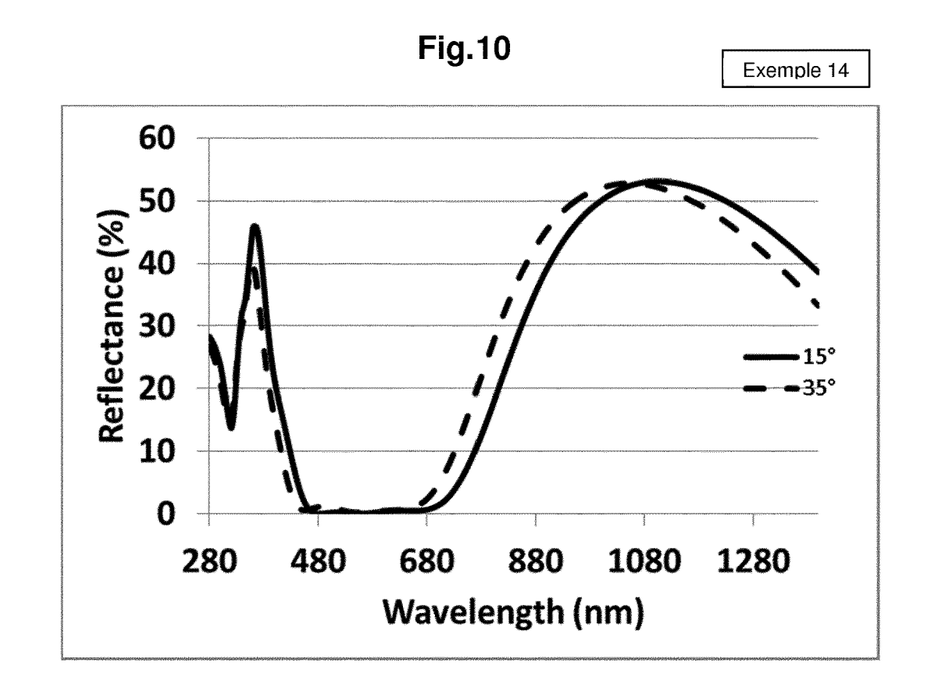
Figure 11:
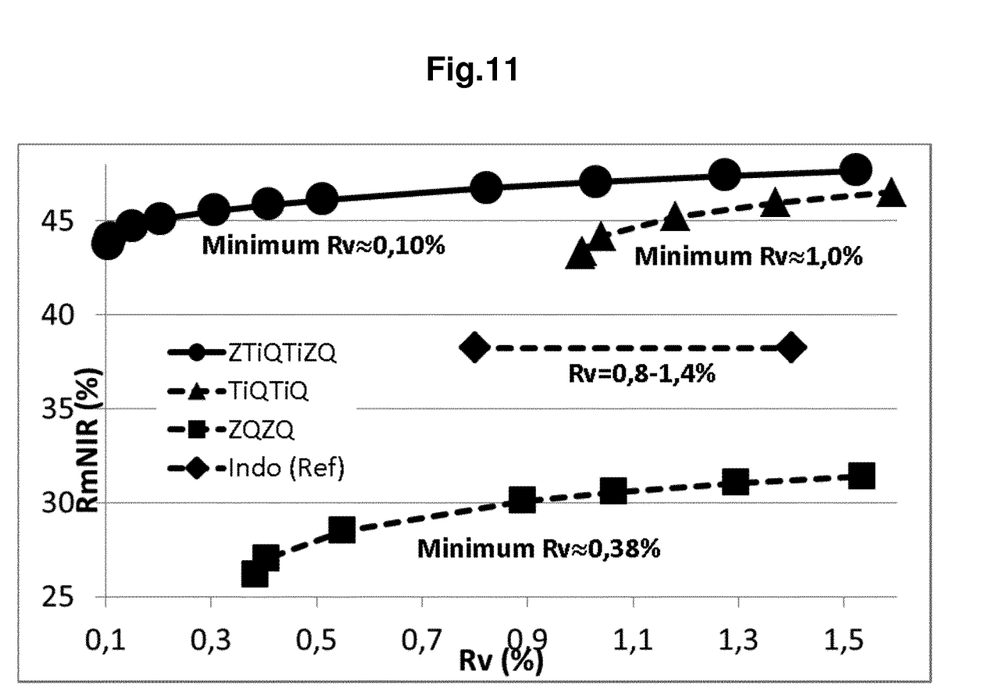
FIGS. 11 to 13 show the variation of the mean light reflection factor $R_v$ according to the mean reflection factor in the near infrared (NIR) region $R_m^{NIR}$ of different antireflective coatings according to the invention or according to the prior art.
Figure 12:
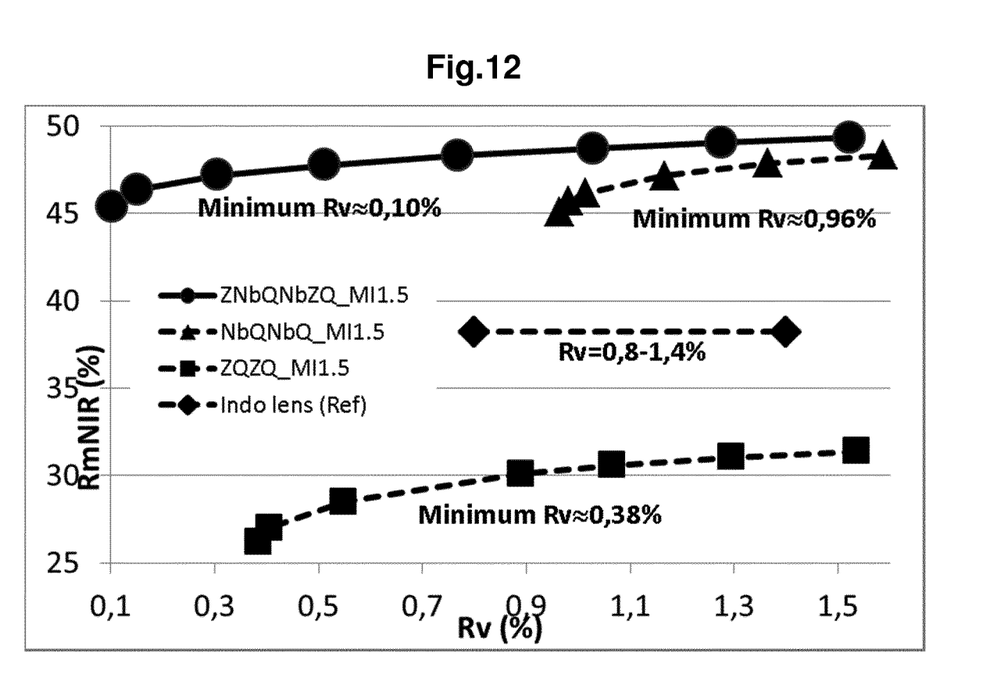
Figure 13:
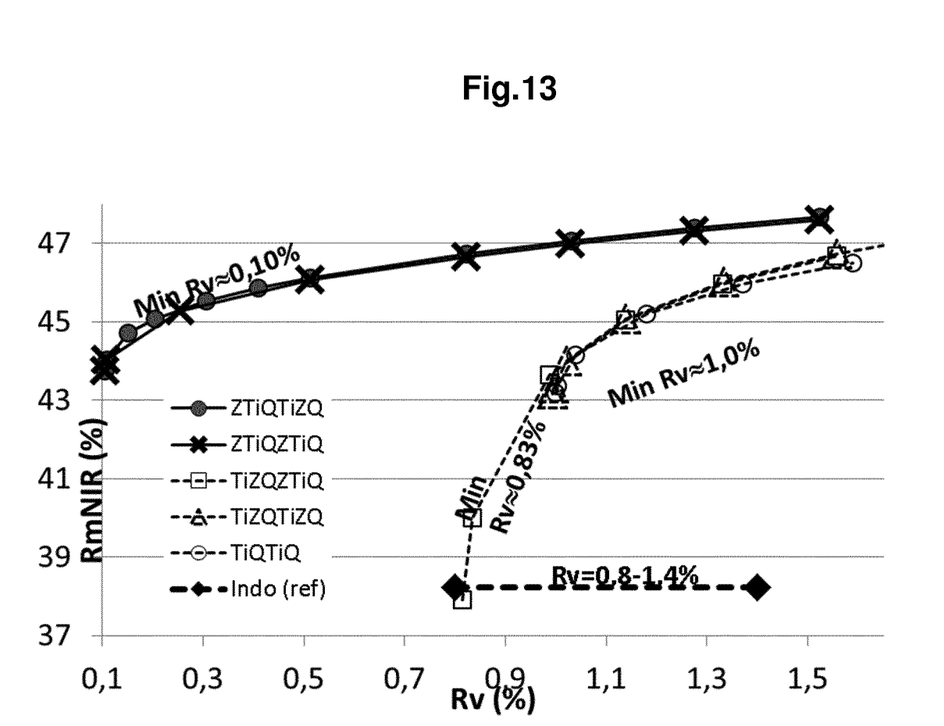

FIGS. 11 to 13 illustrates $R_m^{NIR}$/Rv compromise, for different stacks of antireflective coating according to the invention (ZTiQTiZQ, ZTiQZTiQ, ZNbQNbZQ, ZTiQTiZQ) and of product that are quite popular nowadays on the market (such as Indo Lens, ZQZQ, TiQTiQ) or of comparative coatings (TiZQZTiQ, TiZQTiZQ).

These graphs are plotted according to the following method. A specific Rv value is selected. Then antireflective coating structure (i.e. thicknesses of each metal oxide layers) is optimized to reach the highest $R_m^{NIR}$ value, with the defined materials and order of layers.

From FIGS. 11 to 13, one learns that antireflective coatings cannot reach the domain above the curves for the targeted $R_m^{NIR}$ performances while using defined materials and order of layers.

| | Examples | |
|---|---|---|
| | Comparative examples | According to the invention |
| A | ZQZQ ($ZrO_2$/$SiO_2$/$ZrO_2$/$SiO_2$) | — |
| B | Indo Lens | — |
| C | TiQTiQ ($TiO_2$/SiO2/$TiO_2$/SiO2) | — |
| D | NbQNbQ ($Nb_2O_5$/SiO2/$Nb_2O_5$/$SiO_2$) | — |
| E | — | ZTiQTiZQ ($ZrO_2$/$TiO_2$/$SiO_2$/$TiO_2$/$ZrO_2$/$SiO_2$) |
| F | | ZNbQNbZQ ($ZrO_2$/$Nb_2O_5$/$SiO_2$/$Nb_2O_5$/$ZrO_2$/$SiO_2$) |
| G | | ZTiQZTiQ ($ZrO_2$/$TiO_2$/$SiO_2$/$ZrO_2$/$TiO_2$/$SiO_2$) |

| | Examples | |
|---|---|---|
| | Comparative examples | According to the invention |
| H | TiZQZTiQ<br>(TiO$_2$/ZrO$_2$/SiO$_2$/ZrO$_2$/TiO$_2$/<br>SiO$_2$) | |
| I | TiZQTiZQ<br>(TiO$_2$/ZrO$_2$/SiO$_2$/TiO$_2$/ZrO$_2$/<br>SiO$_2$) | |

It could be observed from FIG. 11 that the antireflective coating according to the invention comprising 6-layers ZTiQTiZQ (ZrO$_2$, TiO$_2$ and SiO$_2$ layers) on MI1.5 substrate shows both low Rv and high R$_m^{NIR}$ as compared to the antireflective coating according to the prior art comprising 4-layers ZQZQ and TiQTiQ and as compared to the commercial product Indo lens. For the ZTiQTiZQ coating according to the invention, the minimum achievable Rv can be as low as 0.1%. Moreover, the NIR reflection of the ZTiQTiZQ stacks can also be higher than that of the 4-layers TiQTiQ coatings. It should be pointed that the total thickness of the ZTiQTiZQ stacks is between those of the 4-layers ZQZQ and TiQTiQ coatings, all lower than 500 nm.

FIG. 12 also shows that the antireflective coating according to the invention comprising 6-layers ZNbQNbZQ (ZrO$_2$, Nb$_2$O$_5$ and SiO$_2$ layers) on MI1.5 substrate shows both low Rv and high R$_m^{NIR}$ as compared to the antireflective coating according to the prior art comprising 4-layers ZQZQ and NbQNbQ and as compared to the commercial product Indo lens. The minimum achievable Rv of the ZNbQNbZQ coatings is also around 0.1%, while the reflection in NIR region can be higher than that of the 4-layers NbQNbQ coatings. The total thickness of the ZNbQNbZQ coatings is between those of the 4-layers ZQZQ and NbQNbQ coatings, all lower than 500 nm.

In addition, FIG. 13 shows that it is important that the layer of the antireflective coating nearest from substrate according to the invention is an HI layer and not a VHI layer so as to obtain a coating having both low R$_v$ and high R$_m^{NIR}$.

The invention claimed is:

1. An optical article comprising a transparent substrate with a front main face and with a rear main face, at least one of the main faces being coated with an antireflective coating, wherein the number of layers of said antireflective coating is higher than or equal to 5, and the antireflective coating comprises:
   at least one layer having a low refractive index which is <1.6, defined as "LI layer";
   at least one layer having a very high refractive index which is 2.2, defined as "VHI layer"; and
   at least one layer having a high refractive index which is 1.6 and <2.2, defined as "HI layer";
   wherein the HI layer is the layer which is the nearest from said substrate among said LI, HI and VHI layers; and
   further wherein a mean light reflection factor in the near infrared (NIR) region R$_m^{NIR}$ of said antireflective coating is higher than or equal to 40% at an angle of incidence lower than 35°,
   wherein the physical thickness of said antireflective coating is lower than or equal to 1 µm.

2. The optical article according to claim 1, wherein the mean light reflection factor in the visible region R$_v$ of said antireflective coating is lower than or equal to 1.5% for at least an angle of incidence lower than 35°.

3. The optical article according to claim 1, wherein the mean light reflection factor in the visible region R$_v$ of said antireflective coating is lower than or equal to 1.0% for at least an angle of incidence lower than 35°.

4. The optical article according to claim 1, wherein the mean light reflection factor in the visible region R$_v$ of said antireflective coating is lower than or equal to 0.5% for at least an angle of incidence lower than 35°.

5. The optical article according to claim 1, wherein the mean reflection factor in the near infrared (NIR) region R$_m^{NIR}$ of said antireflective coating is higher than or equal to 42% at an angle of incidence lower than 35°.

6. The optical article according to claim 1, wherein the mean reflection factor in the near infrared (NIR) region R$_m^{NIR}$ of said antireflective coating is higher than or equal to 45% at an angle of incidence lower than 35°.

7. The optical article according to claim 1, wherein a VHI layer is directly disposed onto said HI layer which is the nearest from the substrate, so as to form a bilayer HI/VHI.

8. The optical article according to claim 7, wherein the layer that is directly deposited onto said bilayer HI/VHI is an LI layer.

9. The optical article according to claim 1, wherein the antireflective coating comprises at least two VHI layers, each one being interleaved and in direct contact with an LI layer and an HI layer.

10. The optical article according to claim 1, wherein said antireflective coating comprises, in the direction moving away from the substrate, the following layers which are in direct contact with each other: an HI layer, a VHI layer, an LI layer, a VHI layer, an optional HI layer, and an LI layer.

11. The optical article according to claim 10, wherein said antireflective coating comprises in the direction moving away from the substrate:
   an HI layer having a physical thickness ranging from 22 to 79 nm;
   a VHI layer having a physical thickness ranging from 53 to 117 nm;
   a LI layer having a physical thickness ranging from 160 to 192 nm;
   a VHI layer having a physical thickness ranging from 81 to 98 nm;
   an optional HI layer having a physical thickness ranging from 0 to 26 nm; and
   an LI layer having a physical thickness ranging from 53 to 81 nm.

12. The optical article according to claim 1, wherein said antireflective coating comprises, in the direction moving away from the substrate, the following layers which are in direct contact with each other: an HI layer, a VHI layer, a LI layer, an optional HI layer, a VHI layer and an LI layer.

13. The optical article according to claim 12, wherein said antireflective coating comprises in the direction moving away from the substrate:
   an HI layer having a physical thickness ranging from 31 to 54 nm;
   a VHI layer having a physical thickness ranging from 74 to 98 nm;
   a LI layer having a physical thickness ranging from 165 to 190 nm;
   an optional HI layer having a physical thickness ranging from 0 to 5 nm;
   a VHI layer having a physical thickness ranging from 87 to 98 nm; and
   a LI layer having a physical thickness ranging from 64 to 85 nm.

14. The optical article according to claim 1, wherein the LI layer comprises $MgF_2$, $SiO_2$, a mixture of silica and alumina, especially silica doped with alumina, or a mixture thereof.

15. The optical article according to claim 14, wherein the LI layer is a $SiO_2$ layer.

16. The optical article according to claim 1, wherein the HI layer comprises one or more metal oxides selected from zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), and yttrium oxide ($Y_2O_3$).

17. The optical article according to claim 16, wherein the HI layer is a $ZrO_2$ layer.

18. The optical article according to claim 1, wherein the VHI layer comprises one or more metal oxides selected from niobium oxide ($Nb_2O_5$), titanium dioxide ($TiO_2$) and mixtures thereof.

19. The optical article according to claim 1, wherein said optical article is an ophthalmic lens.

* * * * *

UNITED STATES PATENT AND TRADEMARK OFFICE
CERTIFICATE OF CORRECTION

Page 1 of 1

PATENT NO. : 10,877,183 B2
APPLICATION NO. : 16/098778
DATED : December 29, 2020
INVENTOR(S) : Xingzhao Ding It is certified that error appears in the above-identified patent and that said Letters Patent is hereby corrected as shown below:

In the Claims

<u>Claim 1, Column 19, Line 53:</u>
Delete "which is 2.2" and replace with -- which is $\geq 2.2$ --.

<u>Claim 1, Column 19, Line 55:</u>
Delete "which is 1.6" and replace with -- which is $\geq 1.6$ --.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*